(12) United States Patent
Colombo et al.

(10) Patent No.: US 12,539,493 B2
(45) Date of Patent: Feb. 3, 2026

(54) CATALYST FOR THE ABATEMENT OF AMMONIA AND NITROGEN OXIDE EMISSIONS FROM THE EXHAUST GASES OF COMBUSTION ENGINES

(71) Applicant: UMICORE AG & CO. KG, Hanau-Wolfgang (DE)

(72) Inventors: Massimo Colombo, Frankfurt am Main (DE); Michael Seyler, Mainaschaff (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 828 days.

(21) Appl. No.: 17/636,585

(22) PCT Filed: Sep. 9, 2019

(86) PCT No.: PCT/EP2019/073966
§ 371 (c)(1),
(2) Date: Feb. 18, 2022

(87) PCT Pub. No.: WO2021/032308
PCT Pub. Date: Feb. 25, 2021

(65) Prior Publication Data
US 2022/0339581 A1 Oct. 27, 2022

(30) Foreign Application Priority Data
Aug. 20, 2019 (EP) .................... 19192426

(51) Int. Cl.
*B01D 53/94* (2006.01)
*B01J 23/42* (2006.01)
(Continued)

(52) U.S. Cl.
CPC ..... *B01D 53/9468* (2013.01); *B01D 53/9418* (2013.01); *B01D 53/9436* (2013.01);
(Continued)

(58) Field of Classification Search
None
See application file for complete search history.

(56) References Cited

U.S. PATENT DOCUMENTS 5,120,695 A 6/1992 Blumrich
7,601,662 B2 10/2009 Bull et al.
(Continued)

FOREIGN PATENT DOCUMENTS

CN 101668589 A 3/2010
CN 104588092 A 5/2015
(Continued)

OTHER PUBLICATIONS

Ch. Baerlocker, Atlas of Zeolite Framework Types, Fifth Revised Edition, XP-0029520202001 (12 pages). (Year: 2001).*
(Continued)

*Primary Examiner* — Jelitza M Perez
(74) *Attorney, Agent, or Firm* — Smith, Gambrell & Russell, LLP

(57) ABSTRACT

The present invention relates to a catalyst comprising
 a carrier substrate of the length L, which extends between a first end face 'a' and a second end face 'b', and
 differently composed material zones A and B arranged on the carrier substrate, wherein
  material zone A comprises platinum and no palladium or platinum and palladium with a weight ratio of Pt:Pd of ≥1 and,
  material zone B comprises a copper containing zeolite having a Cu/Al ratio of 0.355 or higher.

22 Claims, 2 Drawing Sheets

(51) Int. Cl.
  *B01J 23/44* (2006.01)
  *B01J 29/072* (2006.01)
  *B01J 29/72* (2006.01)
  *B01J 35/00* (2006.01)
  *B01J 37/02* (2006.01)
  B01J 35/40 (2024.01)
  B01J 35/45 (2024.01)

(52) U.S. Cl.
  CPC .............. *B01J 23/42* (2013.01); *B01J 23/44* (2013.01); *B01J 29/072* (2013.01); *B01J 29/723* (2013.01); *B01J 35/19* (2024.01); *B01J 37/0228* (2013.01); *B01J 37/0244* (2013.01); *B01J 37/0246* (2013.01); *B01J 37/0248* (2013.01); B01D 2251/2062 (2013.01); B01D 2255/1021 (2013.01); B01D 2255/1023 (2013.01); B01D 2255/20707 (2013.01); B01D 2255/20761 (2013.01); B01D 2255/30 (2013.01); B01D 2255/50 (2013.01); B01D 2255/9022 (2013.01); B01D 2257/404 (2013.01); B01D 2257/406 (2013.01); B01D 2258/012 (2013.01); *B01J 35/40* (2024.01); *B01J 35/45* (2024.01); *B01J 2229/186* (2013.01); *B01J 2229/42* (2013.01)

(56) References Cited

U.S. PATENT DOCUMENTS

| | | | |
|---|---|---|---|
| 7,722,845 | B2 | 5/2010 | Caudle |
| 8,404,203 | B2 | 3/2013 | Bull et al. |
| 8,524,185 | B2 | 9/2013 | Caudle et al. |
| 9,579,638 | B2 | 2/2017 | Fedeyko et al. |
| 9,616,420 | B2 | 4/2017 | Chandler et al. |
| 9,643,161 | B2 | 5/2017 | Chiffey et al. |
| 9,757,718 | B2 | 9/2017 | Fedeyko et al. |
| 9,789,441 | B2 | 10/2017 | Larsson et al. |
| 9,937,489 | B2 | 4/2018 | Larsson |
| 10,188,987 | B2 | 1/2019 | Li et al. |
| 10,512,905 | B2 | 12/2019 | Cardona et al. |
| 10,561,985 | B2 | 2/2020 | Feaviour |
| 11,027,265 | B2 | 6/2021 | Rivas-Cardona et al. |
| 11,213,789 | B2 | 1/2022 | Hilgendorff et al. |
| 2004/0209769 | A1 | 10/2004 | Demel |
| 2009/0011177 | A1* | 1/2009 | Kubo ................ B01J 37/0211 428/116 |
| 2010/0111796 | A1* | 5/2010 | Caudle ................ B01J 37/0244 502/262 |
| 2015/0151288 | A1 | 6/2015 | Rivas-Cardona |
| 2019/0062358 | A1 | 2/2019 | Woerner |
| 2019/0105650 | A1 | 4/2019 | Welsch et al. |

FOREIGN PATENT DOCUMENTS

| | | | | |
|---|---|---|---|---|
| CN | 105555403 | A | 5/2016 | |
| CN | 105899291 | A | 8/2016 | |
| CN | 107262090 | A | 10/2017 | |
| CN | 107667209 | A | 2/2018 | |
| CN | 107847864 | A | 3/2018 | |
| CN | 107949436 | A | 4/2018 | |
| CN | 108712927 | A | 10/2018 | |
| CN | 109499622 | A | 3/2019 | |
| CN | 109789402 | A | 5/2019 | |
| EP | 0 410 440 | A1 | 1/1991 | |
| EP | 2 117 702 | A2 | 11/2009 | |
| EP | 3 210 989 | B1 | 9/2018 | |
| EP | 3 450 016 | A1 | 3/2019 | |
| EP | 2 117 702 | B1 | 11/2020 | |
| JP | 2010-519038 | A | 6/2010 | |
| JP | 2012-507662 | A | 3/2012 | |
| JP | 2017-503635 | A | 2/2017 | |
| JP | 2017-514683 | A | 6/2017 | |
| JP | 2018-515328 | A | 6/2018 | |
| JP | 2018-526193 | A | 9/2018 | |
| JP | 2018-534126 | A | 11/2018 | |
| KR | 10-2011-0094024 | A | 8/2011 | |
| WO | 2002/100520 | A1 | 12/2002 | |
| WO | WO-2008106519 | A1 * | 9/2008 | ............ B01D 39/00 |
| WO | 2010/062730 | A2 | 6/2010 | |
| WO | 2016/160953 | A1 | 10/2016 | |
| WO | 2017/037006 | A1 | 3/2017 | |

OTHER PUBLICATIONS

Notice of Reasons for Refusal mailed Jul. 24, 2023 for Japanese Patent Application No. 2022-511059 (6 pages Japanese; 6 pages English translation).
Giordanino, Filippo et al. Characterization of Cu-exchanged SSz-13: a comparative FTIR, UV-Vis, and EPR study with Cu-ZSM-5 and Cu-β with similar Si/Al and Cu/Al ratios. Dalton Trans. 2013. vol 42, pp. 12741-12761.
Translation of Chinese Office Action dated Apr. 22, 2023 for Chinese Patent Application No. 201980099706.9 (14 pages).
Notice of Preliminary Rejection mailed Jul. 23, 2024 for Korean Patent Application No. 10-2022-7008953 (10 pages in Korean; 9 pages English translation).
Gao, Feng, et al. Effects of Si/Al ratio on Cu/SSZ-13 $NH_3$-SCR catalysts: Implications for the active Cu species and the roles of Brønsted acidity. Journal of Catalysis. 2015. vol. 331, pp. 25-38.
Extended European Search Report mailed Mar. 6, 2020 for European Patent Application No. 19192426.5 (9 pages).
International Preliminary Report on Patentability dated Feb. 17, 2022 for International Patent Application No. PCT/EP2019/073966 (9 pages).
Ch. Baerlocher, Atlas of Zeolite Framework Types, Fifth Revised Edition, XP-0029520202001 (12 pages).
Office Action mailed Dec. 1, 2024 in Brazilian Patent Application No. BR112022003118-1 (5 pages in Portugues; 5 pages English translation).
International Search Report for PCT/EP2019/073966, dated Apr. 24, 2020 (7 pgs. with English Translation).
Written Opinion of the International Searching Authority for PCT/EP2019/073966, dated Apr. 24, 2020 (7 pgs.).
DIN 66132, Determination Of Specific Surface Area of Solids by adsorption of Nitrogen; Single Point Diferential Method According to Haul and Dümbgen, Jul. 1975_(5 pgs.).
Ch. Baerlocher, Atlas of Zeolite Framework Types, Fifth Revised Edition, XP-0029520202001 (12 pages), dated: 2001.
Communication mailed Dec. 9, 2025 in European Patent Application No. 19 765 251.4 (7 pages).
Communication mailed Dec. 8, 2025 in European Patent Application No. 19 192 426.5 (8 pages).

* cited by examiner

CATALYST FOR THE ABATEMENT OF AMMONIA AND NITROGEN OXIDE EMISSIONS FROM THE EXHAUST GASES OF COMBUSTION ENGINES

The present invention relates to a catalyst for the abatement of ammonia and nitrogen oxide emissions from the exhaust gases of combustion engines, in particular of lean operated engines, like diesel engines, said catalyst having several material zones.

In addition to carbon monoxide CO, hydrocarbons HC, and nitrogen oxides $NO_x$, the raw exhaust gas of diesel engines contains a relatively high oxygen content of up to 15 vol %. Particle emissions that predominantly consist of soot residues and possibly organic agglomerates and originate from a partially incomplete fuel combustion in the cylinder of the engine, are contained as well.

While diesel particulate filters with and without a catalytically-active coating are suitable for removing particle emissions, carbon monoxide and hydrocarbons are rendered harmless by oxidation on a suitable oxidation catalyst. Oxidation catalysts are described extensively in the literature. They are, for example, flow-through substrates, which carry precious metals, such as platinum and palladium, as essential, catalytically-active components on large-area, porous, high-melting oxides, such as aluminum oxide.

Nitrogen oxides may be converted on an SCR catalyst in the presence of oxygen to nitrogen and water by means of ammonia. SCR catalysts are described extensively in literature as well. They are generally either so-called mixed oxide catalysts, which contain, in particular, vanadium, titanium, and tungsten, or so-called zeolite catalysts, which comprise a metal-exchanged, in particular small pore zeolite. SCR-catalytically-active materials may be carried on flow-through substrates or on wall-flow filters.

The ammonia used as reducing agent may be made available by feeding an ammonia precursor compound into the exhaust gas which is thermolyzed and hydrolyzed to form ammonia. Examples of such precursors are ammonium carbamate, ammonium formate and preferably urea. Alternatively, the ammonia may be formed by catalytic reactions within the exhaust gas.

In order to improve the conversion of nitrogen oxides at the SCR catalyst, it may be necessary to feed in the ammonia in a quantity that is approximately 10 to 20% higher than the quantity required, i.e., in a overstoichiometric quantity. This in turn leads to unreacted ammonia in the exhaust gas, which is undesirable in view of its toxic effects. Ammonia emissions are increasingly limited in the exhaust gas legislation.

To avoid ammonia emissions, so called ammonia slip catalysts (ASC) have been developed. These catalysts usually comprise an oxidation catalyst for the oxidation of ammonia at temperatures as low as possible. Such oxidation catalysts comprise at least one precious metal, like for example palladium and, in particular, platinum. However, oxidation catalysts comprising precious metals oxidize ammonia not only to nitrogen but to harmful species like dinitrogen oxide ($N_2O$) and nitrogen oxides ($NO_x$) as well. The selectivity of the ammonia oxidation towards nitrogen can be improved by combining the oxidation catalyst with an SCR catalyst. Such combination can be performed in different ways, for example both components can be mixed and/or they can each be present in a separate layer on a carrier substrate. In case of a layered arrangement, the SCR layer is usually the upper layer and is coated on the oxidation layer which is the lower layer. ASC catalysts are usually coated on a monolithic carrier substrate like a flow through substrate or a wall flow filter.

ASC catalysts of this type are for example disclosed in EP0410440A1, WO02/100520A1, EP2117702A2 and WO2010/062730A2.

In these systems a trade off between ammonia oxidation activity and selectivity towards $N_2O$ and $NO_x$ exists. A higher ammonia oxidation is associated with higher $N_2O$ and $NO_x$ production. When ammonia and $NO_x$ are simultaneously fed to these catalysts, a high selectivity towards $N_2O$ and $NO_x$ is observed.

A solution is therefore needed to achieve a higher ammonia conversion at lower selectivity towards $N_2O$ and $NO_x$ and a high SCR activity at lower selectivity towards $N_2O$ and $NO_x$.

The inventors of the present invention surprisingly found that this problem can be solved by an ASC catalyst comprising a copper containing zeolite as SCR catalyst wherein the Cu/Al ratio is above a certain value.

Accordingly, the present invention relates to a catalyst comprising
 a carrier substrate of the length L, which extends between a first end face 'a' and a second end face 'b', and
 differently composed material zones A and B arranged on the carrier substrate, wherein
  material zone A comprises platinum and no palladium or platinum and palladium with a weight ratio of Pt:Pd of ≥1 and,
  material zone B comprises a copper containing zeolite having a Cu/Al ratio of 0.355 or higher.

Figure 1:
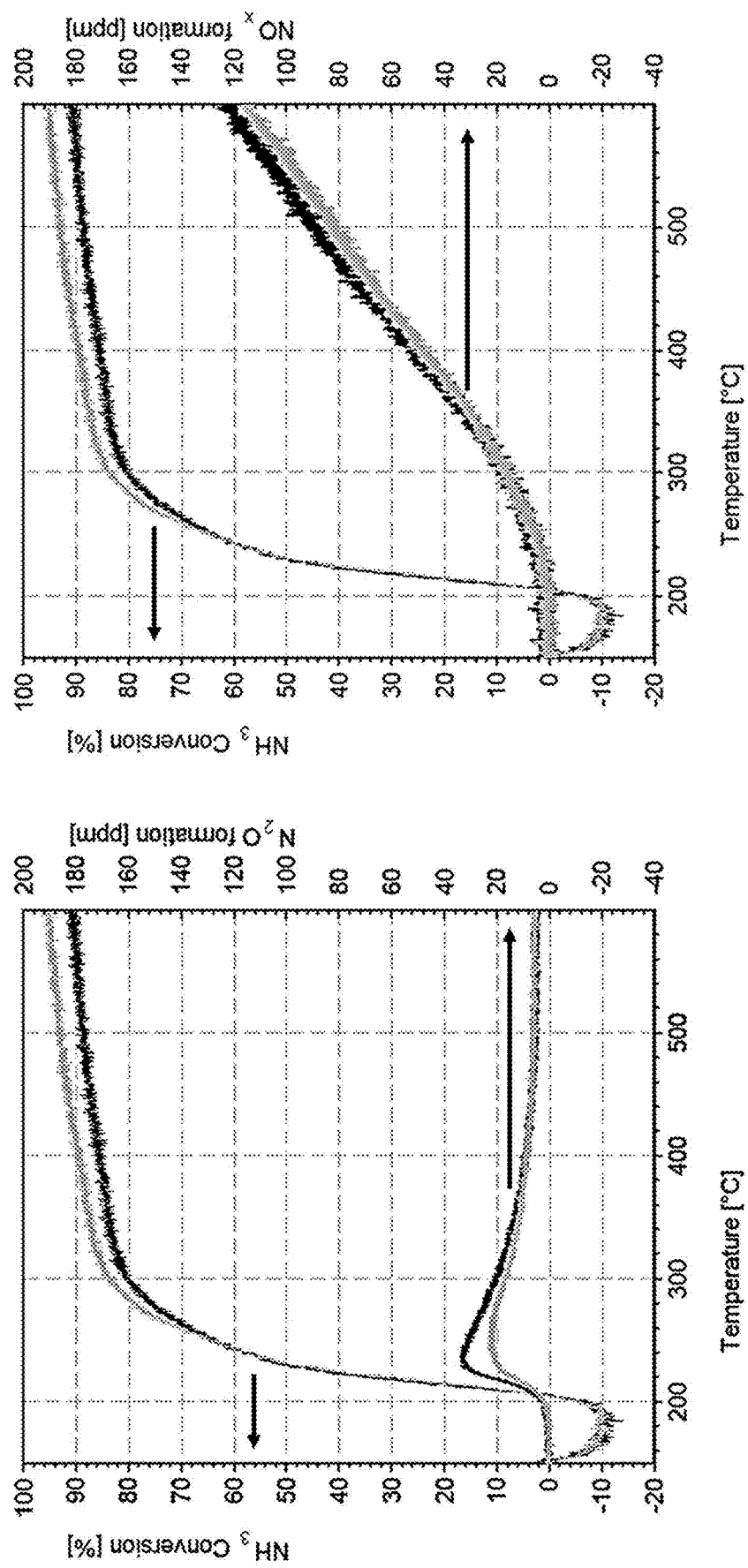
FIG. 1 shows graphic results of a Light Down-Light-Up experiment on catalysts VK1 and K1.

In case material zone A comprises platinum and palladium the weight ratio Pt:Pd is preferably 20:1 to 1:1, in particular 10:1 to 4:1. Examples are 20:1, 12:1, 10:1, 7:1, 6:1, 4:1, 3:1, 2:1, 1.5:1, and 1:1.

However, material zone A preferably comprises only platinum and no palladium. In a preferred embodiment of the present invention, material zone A comprises platinum in the form of platinum particles, wherein the platinum particles have an average particle diameter of 50-200 nm, preferably 80-120 nm.

In the context of the present invention, the term "average particle diameter" is to be understood to mean that which is calculated from X-ray diffraction images based on the [111] main reflection at approximately 39.8° over the full width at half maximum (FWHM) peak width.

Platinum or platinum and palladium are usually supported in material zone A on one or more carrier oxides. These carrier oxides are advantageously high-melting, i.e., their melting point is at a sufficient distance above the temperatures occurring during specified normal operation of the catalyst according to the invention. The carrier oxides, moreover, have an advantageously large surface area and preferably have BET surfaces of 50 to 200 m²/g (determined according to DIN 66132).

Suitable carrier oxides are selected from the group consisting of aluminum oxide, doped aluminum oxide, silicon oxide, titanium oxide, doped titanium oxide, cerium oxide, zirconium oxide, and mixed oxides of one or more these oxides.

Doped aluminum oxides are, for example, silicon oxide-, zirconium oxide-, and/or titanium oxide-doped aluminum oxides. Advantageously used is lanthanum-stabilized aluminum oxide, wherein lanthanum is used in quantities of 1 to 10 wt %—preferably, 3 to 6 wt %—respectively calculated as $La_2O_3$ and with respect to the weight of the stabilized aluminum oxide. Doped titanium oxide is for example silicon oxide-doped titanium oxide.

In a preferred embodiment of the present invention, material zone A comprises platinum in the form of platinum particles, wherein the platinum particles have an average particle diameter of 50-200 nm, preferably 80-120 nm, supported on titanium oxide.

In the context of the present invention, the term "average particle diameter" is the average Pt-crystallite diameter which is calculated from X-ray diffraction images based on the [111] main reflection at approximately 39.8° over the full width at half maximum (FWHM) peak width. As standard silicon is used, generating a peak at approximately 28.4° 2 Theta with a FWHM of 0.06° 2Theta.

Preferably, the titanium oxide is present as titanium dioxide and in particular comprises the crystalline phases anatase and rutile. The phases anatase and rutile are preferably present in a weight ratio greater than 9:1.

The titanium oxide is preferably doped with silicon oxide, in particular with 1 to 10 wt. % of silicon oxide, based on the weight of the doped titanium oxide.

The platinum loading of the carrier oxide is in particular in the range of 0.5 to 20% by weight, preferably 3 to 8% by weight, based on the weight of the carrier oxide.

In embodiments of the present invention wherein platinum is present in form of platinum particles having an average diameter of 50-200 nm, preferably 80-120 nm, the carrier oxide is not alumina.

Platinum in the form of platinum particles, wherein the platinum particles have an average diameter of 50-200 nm, preferably 80-120 nm, supported on a carrier oxide can for example be obtained by depositing platinum from an aqueous solution of water soluble platinum compounds on the carrier oxide, followed by drying and fixing it on the carrier oxide via thermal treatment at 700 to 900° C.

Besides platinum or platinum and palladium with a weight ratio of Pt:Pd of ≥1 supported on a carrier oxide, material zone A can in addition comprise one or more metal oxides which do not carry platinum and/or palladium. Such metal oxide can be the same as the carrier oxide or be different. For example, material zone A can comprise platinum supported on titanium oxide and additional titanium oxide which does not carry platinum.

Zeolites are two- or three-dimensional structures, the smallest structures of which can be considered to be $SiO_4$ and $AlO_4$ tetrahedra. These tetrahedra come together to form larger structures, wherein two are connected each time via a common oxygen atom. Different-sized rings may be formed thereby—for example, rings of four, six, or even nine tetrahedrally-coordinated silicon or aluminum atoms. The different types of zeolite are often defined via the largest ring size, because this size determines which guest molecules can penetrate the zeolite structure, and which not. It is customary to differentiate between large-pore zeolites with a maximum ring size of 12, medium-pore zeolites with a maximum ring size of 10, and small-pore zeolites with a maximum ring size of 8.

Furthermore, zeolites are grouped by the Structural Commission of the International Zeolite Association into structural types which are each provided with a three-letter code; see, for example, Atlas of Zeolite Framework Types, Elsevier, 5th edition, 2001.

The zeolite of material zone B can be a large-pore, medium-pore or small-pore zeolite. Examples of suitable zeolites belong to the structural type ABW, AEI, AFX, BEA, CHA, DDR, ERI, ESV, FAU, FER, KFI, LEV, LTA, MER MFI, MWW, SOD or STT. Preferably, the zeolite of material zone B is a small-pore zeolite and belongs in particular to the structural type AEI, AFX, CHA or LEV.

More preferably, the zeolite of material zone B belongs to the structural type CHA.

The zeolite of material zone B preferably has an SAR (silica-to-alumina ratio) value of 2 to 100, more preferably 5 to 50, and most preferably 10 to 40.

In the context of the present invention the term zeolites also includes molecular sieves, which are sometimes also referred to as "zeolite-like" compounds. Molecular sieves are preferred, if they belong to one of the aforementioned structure types. Examples include silica aluminum phosphate zeolites, which are known by the term, SAPO, and aluminum phosphate zeolites, which are known by the term, AlPO.

The Cu/Al ratio of the copper containing zeolite is preferably from 0.355 to 2, for example from 0.355 to 1.5, 0.355 to 1 or 0.355 to 0.75. More preferably it is from 0.355 to 0.5 and most preferably from 0.4 to 0.45.

For the avoidance of doubt, it is expressly noted that only alumina which is part of the three-dimensional zeolite structure and alumina which may be present within the zeolite structure is used to calculate the Cu/Al ratio. Alumina of for example an alumina binder which may be present as part of a washcoat is not entered into the calculation of the Cu/Al ratio.

The amount of copper in weight % calculated as CuO and based on the weight of the copper containing zeolite can be easily calculated by the skilled person if the SAR (silica-to-alumina ratio) value of the zeolite is known. For example, in case of a zeolite with an SAR of 13, the Cu/Al ratio of 0.355 corresponds to 6 wt % of copper calculated as CuO and based on the weight of the copper containing zeolite. Likewise, a Cu/Al ratio of 0.5 corresponds to 8.26 wt % and a Cu/Al ratio of 0.42 to 7% of copper calculated as CuO and based on the weight of the copper containing zeolite.

The copper is preferably present as copper cation in the zeolite structure, i.e., in ion-exchanged form. However, it may also be wholly or partially present as copper oxide in the zeolite structure and/or on the surface of the zeolite structure.

The catalyst according to the present invention comprises a carrier substrate. This may be a flow-through substrate or a wall-flow filter.

A wall-flow filter is a supporting body that comprises channels of length L which extend in parallel between a first and a second end of the wall-flow filter, which are alternatingly sealed either at the first or second end, and which are separated by porous walls. A flow-through substrate differs from a wall-flow filter, in particular in that the channels of length L are open at its two ends.

In an uncoated state, wall-flow filters have, for example, porosities of 30 to 80%—in particular, 50 to 75%. In the uncoated state, their average pore size is 5 to 30 micrometers, for example.

Generally, the pores of the wall-flow filter are so-called open pores, i.e., they have a connection to the channels. Furthermore, the pores are normally interconnected with one another. This enables easy coating of the inner pore surfaces, on the one hand, and an easy passage of the exhaust gas through the porous walls of the wall-flow filter, on the other.

Flow-through substrates are known to the person skilled in the art, as are wall-flow filters, and are commercially available. They consist, for example, of silicon carbide, aluminum titanate, or cordierite.

In an embodiment of the present invention a carrier substrate is used which is composed of corrugated sheets of inert material. Such carrier substrates are known to those skilled in the art as corrugated substrates. Suitable inert materials are, for example, fibrous materials having an average fiber diameter of 50 to 250 µm and an average fiber length of 2 to 30 mm. Preferably, fibrous materials are heat-resistant and consist of silicon dioxide, in particular of glass fibers.

To produce such carrier substrates, for example, sheets of said fiber materials are corrugated in a known manner and the individual corrugated sheets are formed into a cylindrical monolithically structured body with channels passing through the body. Preferably, by laminating a number of the corrugated sheets to parallel layers having different orientation of corrugation between the layers, a monolithic structured body having a criss-cross corrugation structure is formed. In an embodiment non-corrugated, i.e. flat leaves can be arranged between the corrugated sheets.

Substrates composed of corrugated sheets may be directly coated with the catalyst of the present invention. It is however preferred to coat such substrates with an inert material, for example titania, first and only thereafter with the catalyst of the present invention.

Usually, the material zones A and B are present in the form of coatings on the carrier substrate, with other words form washcoat layers or washcoat zones on the carrier substrate.

In one embodiment, material zones A and B both extend over 100% of the length L of the carrier substrate. In this case material zone A is usually coated on the carrier substrate and forms the lower layer, for example directly on the carrier substrate, while material zone B is coated on material zone A and forms the top layer.

In another embodiment, material zone A is coated only over a portion of the length L of the carrier substrate, for example over a length $L_A$ which is 20 to 60% of the length L, while material zone B is coated over 100% of the length L.

In the case of a wall-flow filter, material zones A and B may be situated on the surfaces of the input channels, on the surfaces of the output channels, and/or in the porous wall between the input and output channels.

Catalysts according to the invention, in which material zones A and B are present in the form of coatings on the carrier substrate, may be produced according to the methods familiar to the person skilled in the art, such as according to the usual dip coating methods or pump and suck coating methods with subsequent thermal post-treatment (calcination). A person skilled in the art knows that, in the case of wall-flow filters, their average pore size and the average particle size of the materials to be coated can be adapted to each other such that they lie on the porous walls that form the channels of the wall-flow filter (on-wall coating). The average particle sizes of the materials to be coated may, however, be selected such that said materials are located in the porous walls that form the channels of the wall-flow filter so that the inner pore surfaces are thus coated (in-wall coating). In this instance, the average particle size of the materials to be coated must be small enough to penetrate the pores of the wall-flow filter.

The catalysts according to the invention are in particular suitable as ammonia slip catalysts, i.e. can avoid or at least minimize ammonia emissions, so as to meet the current legislations standards.

They are preferably integrated into an exhaust gas purification system such that exhaust gas that has passed an SCR catalyst enters the inventive catalyst at end face 'a' and exits it again at end face 'b'.

The present invention thus also relates to a catalyst arrangement comprising, one after the other, a first device for feeding in ammonia or an ammonia precursor, a first SCR catalyst, and a catalyst according to the invention, wherein the catalyst according to the invention is arranged such that its end face 'a' points in the direction of the first SCR catalyst.

A device for feeding in ammonia or an ammonia precursor is preferably a device for feeding in an aqueous solution of urea. Such devices are known to the person skilled in the art and can be acquired on the market.

A flow-through substrate or a wall flow filter that is coated with an SCR-active material comes, in particular, into consideration as first SCR catalyst.

In addition to zeolites comprising copper and/or iron, mixed-oxide catalysts, for example VWT catalysts come into consideration as SCR-active material. VWT catalysts are catalysts based upon $V_2O_5$, $WO_3$, and $TiO_2$.

The first SCR catalyst preferably comprises a VWT catalyst, or zeolites or molecular sieves of the structural type AEI, BEA, CHA or LEV exchanged with copper, iron, or copper and iron.

EXAMPLE 1 a) Platinum is precipitated from an aqueous solution of tetraethylammonium hexahydroxoplatinate (EP 3 210 989 B1) onto a titanium oxide powder stabilized with 5% by weight of silica by adding diluted nitric acid to obtain a material having a concentration of 3% by weight of Pt on the titanium oxide powder. Subsequently, the powder thus prepared is filtered off, dried and fixed at 800° C. for 2 h under air atmosphere.

b) The powder obtained according to a) is then slurried in water and the desired loading of 0.14% by weight of Pt (based on the total titanium oxide powder) is adjusted by addition of platinum-free titanium oxide. The washcoat thus obtained is used to coat a commercially available ceramic flow-through substrate having the cell density of 400 cpsi and a wall thickness of 110 µm in a conventional manner over its entire length. Then, the coated substrate is dried at 110° C. and calcined at 600° C. for 6 hours. The washcoat loading of the catalyst is 25 g/l, the platinum loading of the catalyst is 0.0353 g/l.

c) A zeolite of the structure type CHA (SAR=13) is loaded with copper in an amount of 7 wt % , calculated as CuO and based on the weight of the copper containing zeolite. The Cu/Al ratio is 0.42. The zeolite thus obtained is dispersed in water containing a binder material to obtain a washcoat.

d) The washcoat obtained according to c) is coated as top layer onto the coated substrate obtained according to b) over its total length. The washcoat loading is 100 g/L.

Then, the coated substrate is dried at 110° C. and calcined at 600° C. for 6 hours.

The catalyst this obtained is called K1.

COMPARISON EXAMPLE 1

Example 1 is repeated with the exception that the zeolite obtained according to step c) is loaded with copper in an amount of 5.5 wt % The Cu/Al ratio is 0.325.

The catalyst this obtained is called VK1

Comparison Tests a) Catalysts K1 and VK1 were aged at 750° C. for 16 h in an atmosphere comprising 10% of $H_2O$ and 10% of $O_2$.
b) In a Light Down-Light-up experiment with $NH_3$, $O_2$ and $H_2O$ in the feed the light-up phase was considered, in which the temperature is increased from 100° C. to 600° C. at 5K/min. Compared to catalyst VK1, catalyst K1 according to the present invention showed improved $NH_3$ conversion, 20% less average $N_2O$ formation, 30% less maximum $N_2O$ concentration and 5% less NO selectivity. The results are also shown in FIG. 1 where the grey graphs correspond to catalyst K1 and the black graphs to catalyst VK1.
c) In a mapping test with $NH_3$, NO, $O_2$ and $H_2O$ in the feed the NOx conversion and $N_2O$ formation obtained was determined when a concentration of 20 ppm of $NH_3$ is achieved at the reactor outlet.

Figure 2:
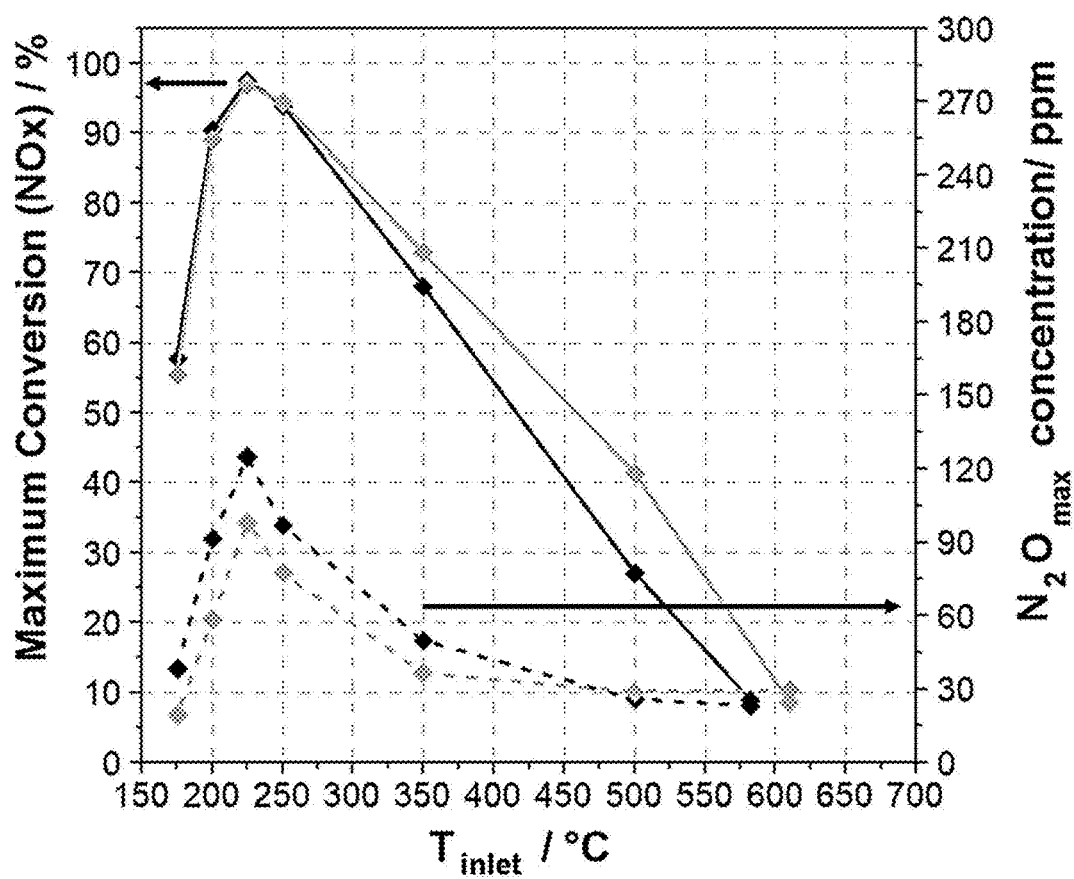
FIG. 2 shows graphic results of a mapping test with NH3, NO, O2 and H2O in the feed and the NOx conversion and $N_2O$ formation obtained.

The result is given in FIG. 2. As can be seen, when compared to VK1 (black graphs) catalyst K1 (grey graphs) according to the present invention shows improved NOx conversion at temperatures above 250° C. and significantly lower $N_2O$ formation up to 500° C. In FIG. 2, the continuous lines correspond to the NOx conversion (left y-axis) and the dotted lines correspond to the $N_2O$ concentration (right y-axis)

The invention claimed is:

1. Catalyst comprising
a carrier substrate of the length L, which extends between a first end face 'a' and a second end face 'b', and
differently composed material zones A and B arranged on the carrier substrate, wherein
material zone A comprises platinum and no palladium or platinum and palladium with a weight ratio of Pt:Pd of ≥1 and,
material zone B comprises a copper containing zeolite having a Cu/Al ratio of 0.4 to 2, and wherein
material zone A comprises platinum in the form of platinum particles, wherein the platinum particles have an average diameter of 50-200 nm.

2. Catalyst according to claim 1, characterized in that material zone A comprises platinum and no palladium.

3. Catalyst according to claim 1, wherein the platinum particles have an average diameter of 80-120 nm.

4. Catalyst according to claim 1, characterized in that platinum or platinum and palladium in material zone A are supported on one or more carrier oxides.

5. Catalyst according to claim 4, characterized in that the carrier oxides are selected from the group consisting of aluminum oxide, doped aluminum oxide, silicon oxide, titanium oxide, doped titanium oxide, cerium oxide, zirconium oxide, and mixed oxides of one or more thereof.

6. Catalyst according to claim 1, wherein the platinum particles are supported on titanium oxide.

7. Catalyst according to claim 6, characterized in that titanium oxide is doped with silicon oxide.

8. Catalyst according to claim 7, characterized in that titanium oxide is doped with 1 to 10 wt. % of silicon oxide, based on the weight of the doped titanium oxide.

9. Catalyst according to claim 1, characterized in that the zeolite of material zone B belongs to the structural type ABW, AEI, AFX, BEA, CHA, DDR, ERI, ESV, FAU, FER, KFI, LEV, LTA, MER MFI, MWW, SOD or STT.

10. Catalyst according to claim 1, characterized in that the zeolite of material zone B belongs to the structural type CHA.

11. Catalyst according to claim 1, characterized in that the zeolite of material zone B has an SAR (silica-to-alumina ratio) value of 2 to 100.

12. Catalyst according to claim 1, characterized in that the copper containing zeolite of material zone B has a Cu/Al ratio of 0.4 to 1.0.

13. Catalyst according to claim 1, characterized in that the copper containing zeolite of material zone B has a Cu/Al ratio of 0.4 to 0.45.

14. Catalyst according to claim 1, characterized in that material zones A and B both extend over 100% of the length L of the carrier substrate.

15. Catalyst according to claim 14, characterized in that material zone A is coated on the carrier substrate and forms the lower layer, while material zone B is coated on material zone A and forms the top layer.

16. Catalyst according to claim 1, characterized in that material zone A is coated over 20 to 60% of the length L of the carrier substrate, while material zone B is coated over 100% of the length L of the carrier substrate.

17. Catalyst arrangement comprising, one after the other, a first device for feeding in ammonia or an ammonia precursor, a first SCR catalyst, and a zone A and zone B catalyst according to claim 1, wherein the zone A and zone B catalyst is arranged such that its end face 'a' points in the direction of the first SCR catalyst.

18. Catalyst according to claim 1, characterized in that the zeolite of material zone B has a SAR (silica-to-alumina ratio) value of 2 to 13.

19. Catalyst according to claim 1, characterized in that the copper containing zeolite of material zone B has a Cu/Al ratio of 0.4 to 0.75, and wherein the wt % of copper, calculated as CuO and based on the weight of the copper containing zeolite, is 6 to 8.26 wt %.

20. Catalyst according to claim 1, characterized in that the copper is present as copper cation in the zeolite structure.

21. Catalyst according to claim 1, characterized in that material zone A comprises both platinum supported on carrier oxides and carrier oxides free of platinum.

22. Catalyst according to claim 21, wherein the carrier oxides supporting the platinum include titanium oxide and the carrier oxides free of platinum also include titanium oxide.

* * * * *